United States Patent
Okutani

(10) Patent No.: US 9,007,717 B2
(45) Date of Patent: Apr. 14, 2015

(54) TOP COVER HAVING A PATTERNED GASKET FIXING REGION, DISK DRIVE APPARATUS, AND METHOD OF MANUFACTURING TOP COVER

(71) Applicant: Nidec Corporation, Kyoto (JP)

(72) Inventor: Jumpei Okutani, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 14/299,149

(22) Filed: Jun. 9, 2014

(65) Prior Publication Data

US 2014/0368948 A1 Dec. 18, 2014

(30) Foreign Application Priority Data

Jun. 13, 2013 (JP) .................................. 2013-124953

(51) Int. Cl.
*G11B 33/14* (2006.01)
*F16J 15/32* (2006.01)
*F16J 15/02* (2006.01)

(52) U.S. Cl.
CPC ............. *G11B 33/1486* (2013.01); *Y10T 29/49* (2015.01); *F16J 15/3268* (2013.01); *F16J 15/021* (2013.01); *F16J 15/32* (2013.01); *G11B 33/1446* (2013.01); *G11B 33/1466* (2013.01)

(58) Field of Classification Search
CPC ............... G11B 33/14; G11B 33/1446; G11B 33/1466; F16J 15/021; F16J 15/32; F16J 15/3268
USPC ............ 360/97.12, 97.19, 99.18, 99.2, 99.21, 360/99.22; 277/637, 638, 640, 641, 642, 277/643
See application file for complete search history.

(56) References Cited

U.S. PATENT DOCUMENTS

| | | | |
|---|---|---|---|
| 6,760,986 B1 * | 7/2004 | MacNeil | 40/200 |
| 7,420,771 B1 * | 9/2008 | Hanke et al. | 360/99.18 |
| 7,654,538 B2 * | 2/2010 | Oka et al. | 277/644 |
| 8,833,772 B2 * | 9/2014 | Sasaki et al. | 277/639 |
| 2002/0030923 A1 * | 3/2002 | Satoh et al. | 360/97.02 |
| 2002/0135932 A1 * | 9/2002 | Daniel et al. | 360/97.02 |
| 2004/0173976 A1 * | 9/2004 | Boggs | 277/628 |
| 2006/0049585 A1 | 3/2006 | Isono | |
| 2006/0055069 A1 * | 3/2006 | DiMatteo et al. | 261/142 |
| 2012/0251239 A1 * | 10/2012 | Banks | 404/25 |
| 2014/0152890 A1 * | 6/2014 | Rayner | 348/376 |

FOREIGN PATENT DOCUMENTS

| | | |
|---|---|---|
| JP | 2001-280507 A | 10/2001 |
| JP | 2001-311470 A | 11/2001 |
| JP | 2004-036739 A | 2/2004 |
| JP | 2004-076877 A | 3/2004 |
| JP | 2008-001002 A | 1/2008 |

* cited by examiner

*Primary Examiner* — Jefferson Evans
(74) *Attorney, Agent, or Firm* — Keating & Bennett, LLP

(57) ABSTRACT

A top cover for use in a disk drive apparatus includes a plate made of a metal and a gasket fixed to the plate. The gasket is made of an elastomer. A surface of the plate includes a fixing region to which the gasket is closely adhered. The fixing region includes a plurality of ridges and in plan view a plurality of filamentous projections extending from each of the plurality of ridges. The plurality of ridges are arranged in the fixing region to increase a surface area of the fixing region. The plurality of ridges and the plurality of filamentous projections extending from each ridge are distributed over the fixing region.

22 Claims, 15 Drawing Sheets

TOP COVER HAVING A PATTERNED GASKET FIXING REGION, DISK DRIVE APPARATUS, AND METHOD OF MANUFACTURING TOP COVER

BACKGROUND OF THE INVENTION

1. Field of the Invention

The present invention relates to a top cover, a disk drive apparatus, and a method of manufacturing the top cover.

2. Description of the Related Art

A disk drive apparatus, such as a hard disk apparatus or an optical disk apparatus, typically includes a gasket between a base plate and a top cover in order to maintain hermetic sealing of an interior thereof.

JP-A 2001-311470, for example, describes a known hard disk apparatus including such a gasket. In the hard disk apparatus described in JP-A 2001-311470, a top cover and a cover gasket are fixed to each other through an adhesive (see, for example, claim 1 and paragraph [0028] of JP-A 2001-311470).

However, when the adhesive is used to fix the cover gasket to the top cover as in the hard disk apparatus described in JP-A 2001-311470, outgassing from the adhesive may occur. The outgassing from the adhesive may occur, not only when the adhesive is cured, but also even after the hard disk apparatus or the like is assembled. Then, if minute particles in a gas resulting from the outgassing from the adhesive are adhered to a disk, an error may occur in reading or writing from or to the disk.

Meanwhile, in recent years, capacities of disks used in disk drive apparatuses have been increasing, and there has accordingly been a technical demand for increased cleanliness in the disk drive apparatuses. For example, there has been a demand to reduce outgassing in the disk drive apparatuses. However, when the adhesive is used to fix the cover gasket to the top cover as in the hard disk apparatus described in JP-A 2001-311470, it is difficult to reduce the outgassing.

SUMMARY OF THE INVENTION

Preferred embodiments of the present invention provide a technique of fixing a gasket without use of an adhesive.

A top cover for use in a disk drive apparatus according to a first preferred embodiment of the present invention includes a plate made of a metal, and a gasket made of an elastomer. The gasket made of the elastomer is fixed to the plate. A surface of the plate includes a fixing region to which the gasket is closely adhered. The fixing region includes a plurality of ridges and a plurality of filamentous projections. In plan view, the filamentous projections extend from each ridge.

A disk drive apparatus according to a second preferred embodiment of the present invention includes a base plate, a top cover made of a metal, a gasket made of an elastomer, a spindle motor, and an access portion. The base plate includes a bottom portion and a wall portion. The wall portion extends upward from an outer circumferential portion of the bottom portion, and surrounds the bottom portion. The top cover is configured to close an upper side of the base plate to define a case together with the base plate. The gasket is fixed to an upper end surface of the wall portion, and is arranged to be in contact with a lower surface of the top cover. A disk is supported by the spindle motor. The access portion is configured to perform at least one of reading and writing of information from or to the disk. A rotating portion of the spindle motor and the access portion are accommodated in an interior of the case defined by the base plate and the top cover. The base plate includes, in the upper end surface of the wall portion, a fixing region to which the gasket is closely adhered. The fixing region includes a plurality of ridges and a plurality of filamentous projections. In plan view, the filamentous projections are arranged to extend from each ridge.

A method of manufacturing a top cover for use in a disk drive apparatus according to a third preferred embodiment of the present invention includes steps a), b), and c). In step a), a fixing region including a plurality of ridges and a plurality of filamentous projections arranged to extend from each of the ridges is defined in a surface of a plate. In step b), the plate is cleaned after step a). In step c), a gasket is injection-molded on the plate after step b). The gasket is closely adhered to the fixing region in step c).

According to the first preferred embodiment of the present invention, the gasket is fixed to the plate, and the ridges are arranged in the fixing region of the plate to increase a surface area of the fixing region. The plurality of ridges and the plurality of filamentous projections extending from each ridge are distributed over the fixing region, such that a surface shape of the plate becomes irregular and non-uniform. That is, the surface area of the fixing region is further increased. This makes it possible to securely fix the gasket to the plate without use of an adhesive.

According to the second preferred embodiment of the present invention, the gasket is fixed to the wall portion of the base plate, and the ridges are arranged in the fixing region of the wall portion to increase a surface area of the fixing region. The plurality of ridges and the plurality of filamentous projections arranged to extend from each ridge are distributed over the fixing region, such that a rugged shape of the upper end surface of the wall portion becomes irregular and non-uniform. That is, the surface area of the fixing region is further increased. This makes it possible to securely fix the gasket to the wall portion without use of an adhesive.

According to the third preferred embodiment of the present invention, after the fixing region is defined in the plate, and the plate is cleaned, the gasket is injection-molded on the plate. In the fixing region, the plurality of ridges and the plurality of filamentous projections extending from each of the ridges are defined. As a result, a surface area of the fixing region is increased. This makes it possible to securely fix the gasket to the plate without use of an adhesive.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel or substantially parallel to a rotation axis of a spindle motor is referred to by the term "axial direction", "axial", or "axially", that directions perpendicular or substantially perpendicular to the rotation axis of the spindle motor are referred to by the term "radial direction", "radial", or "radially", and that a direction along a circular arc centered on the rotation axis of the spindle motor is referred to by the term "circumferential direction", "circumferential", or "circumferentially". It is also assumed herein that a vertical direction is an axial direction, and that a side on which a top cover is arranged with respect to a base plate is defined as an upper side. The shape of each member or portion and relative positions of different members or portions will be described based on the above assumptions. It should be noted, however, that the above definitions of the vertical direction and the upper and lower sides are not meant to restrict in any way the orientation of a top cover or a disk drive apparatus according to any preferred embodiment of the present invention when in use.

Also note that the phrase "parallel direction" as used herein comprehends both parallel and substantially parallel directions. Also note that the wording "perpendicular direction" as used herein comprehends both perpendicular and substantially perpendicular directions. Also note that the wording "the direction along the circular arc" as used herein comprehends both directions along and substantially along the circular arc.

Figure 1:
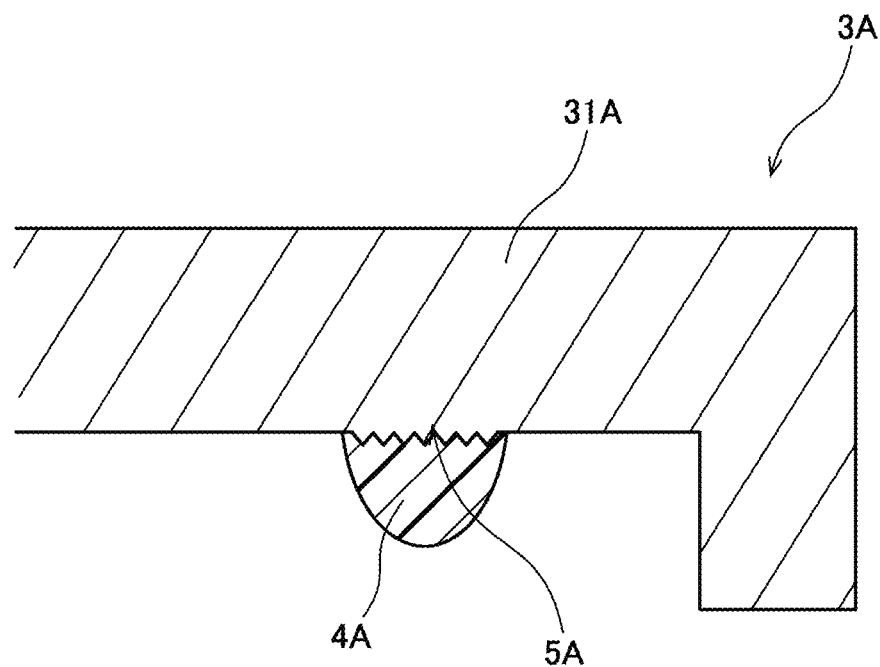
FIG. 1 is a partial vertical cross-sectional view of a top cover according to a first preferred embodiment of the present invention.
Figure 2:
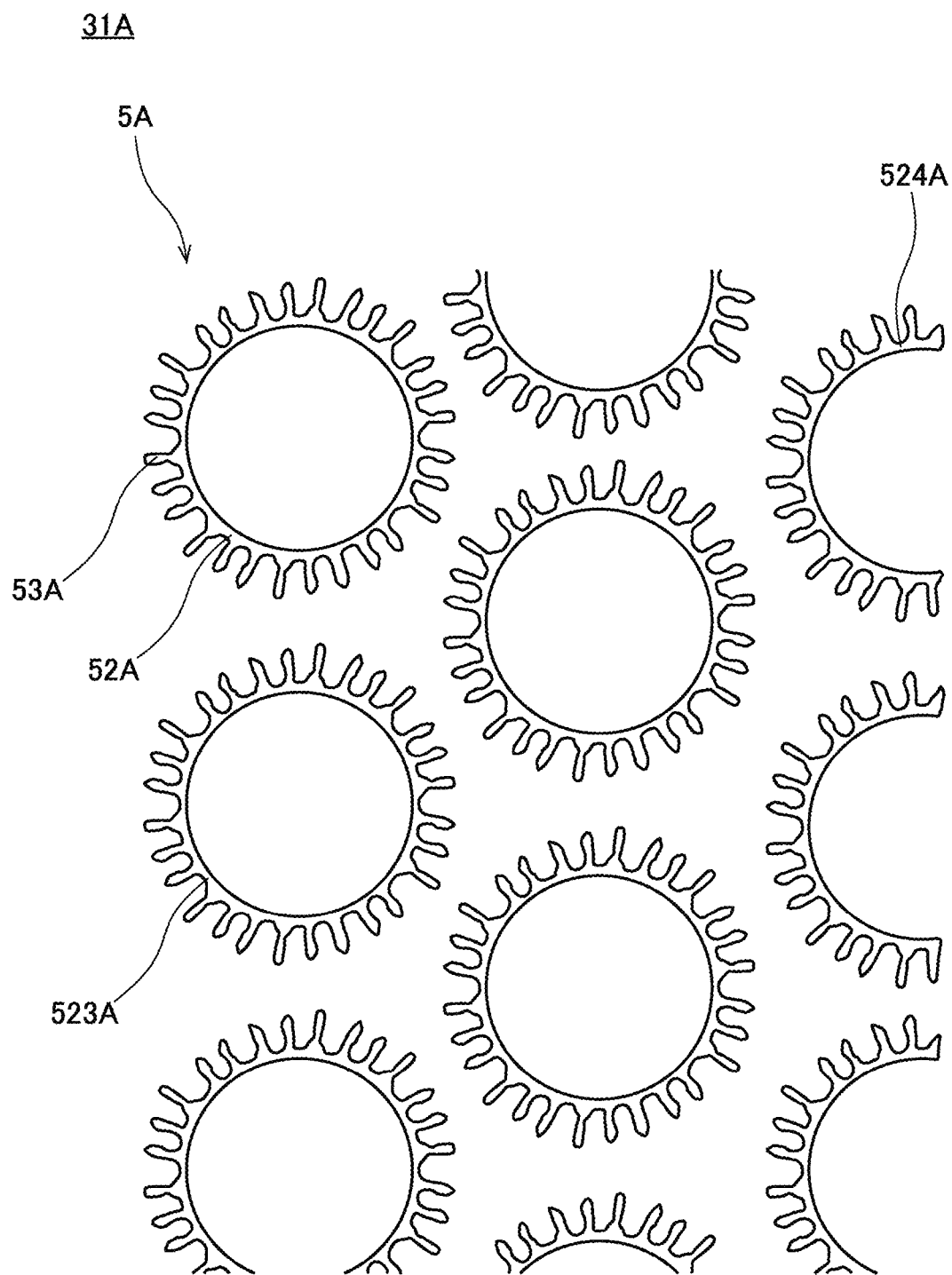
FIG. 2 is a partial bottom view of a plate according to the first preferred embodiment of the present invention.

FIG. 1 is a partial vertical cross-sectional view of a top cover 3A according to a first preferred embodiment of the present invention. FIG. 2 is a partial bottom view of a plate 31A according to the first preferred embodiment. The top cover 3A according to the present preferred embodiment is preferably used, for example, in a disk drive apparatus. Referring to FIG. 1, the top cover 3A includes the plate 31A and a gasket 4A.

The plate 31A is made of a metal, and preferably is in the shape of a thin plate. In addition, the plate 31A preferably includes a fixing region 5A in a surface thereof.

The gasket 4A is preferably made of, for example, an elastomer. The gasket 4A is fixed to the plate 31A. In addition, the gasket 4A is closely adhered to the fixing region 5A. Note that it is enough that at least a portion of the gasket 4A should be closely adhered to at least a portion of the fixing region 5A.

Referring to FIG. 2, the fixing region 5A preferably includes a plurality of ridges 52A and a plurality of filamentous projections 53A arranged to extend from each of the ridges 52A. Here, the term "ridge" refers to a portion which rises in the shape of a ridge in a surface of any member. In the present preferred embodiment, the fixing region 5A is preferably located in a lower surface of the plate 31A, and therefore, each ridge 52A refers to a portion which extends downward in the fixing region 5A.

Provision of the ridges 52A in the fixing region 5A increases a surface area of the fixing region 5A. In addition, the filamentous projections 53A extend from each ridge 52A in plan view. In other words, the plurality of ridges 52A and the plurality of filamentous projections 53A are distributed over the fixing region 5A. A surface shape of the fixing region 5A becomes irregular and non-uniform due to the ridges 52A and the filamentous projections 53A included in the fixing region 5A. That is, the surface area of the fixing region 5A is increased. This increases the strength with which the gasket 4A and the fixing region 5A are mechanically joined to each other through an anchor effect. Accordingly, the plate 31A and the gasket 4A are securely fixed to each other without use of an adhesive.

In the present preferred embodiment, the ridges 52A are preferably annular ridges 523A, each of which is annular or substantially annular in shape. In addition, the plurality of filamentous projections 53A are preferably arranged to extend from each annular ridge 523A. Each annular ridge 523A and the filamentous projections 53A according to the present preferred embodiment are arranged to assume, for example, a so-called milk-crown shape as shown in FIG. 2. Some of the ridges 52A are preferably non-annular ridges 524A, each of which is not annular in shape. A surface shape of the plate 31A becomes more irregular and non-uniform due to the ridges 52A being defined in the annular shape, that is, by the fixing region 5A including the annular ridges 523A. As a result, the gasket 4A and the plate 31A are more securely fixed to each other.

The ridges 52A can preferably be defined, for example, by spot-irradiating the surface of the plate 31A with laser beams. At this time, the annular ridges 523A are defined when positions which do not overlap with one another on the surface of the plate 31A are spot-irradiated with the laser beams. This manner of spot irradiation prevents any ridge 52A or filamentous projection 53A previously defined from being destroyed by newly spot-irradiating another position with a laser beam. Note that the non-annular ridges 524A may be defined as in the present preferred embodiment through masking or any of various conditions at the time of the laser beam irradiation.

Figure 3:
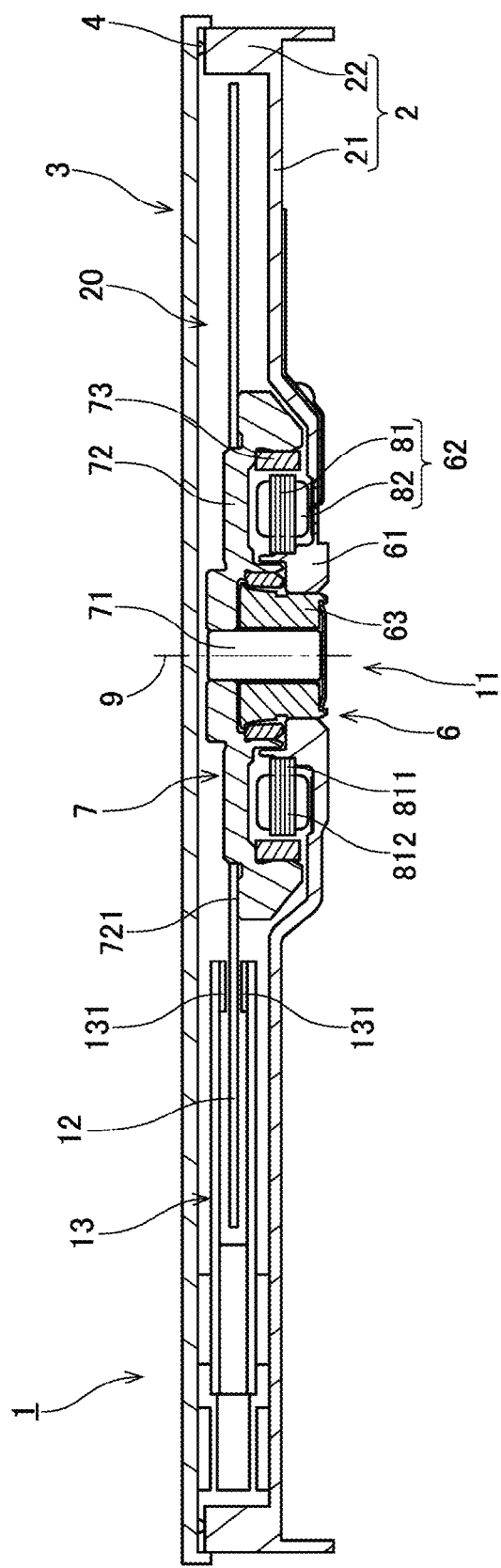
FIG. 3 is a vertical cross-sectional view of a disk drive apparatus according to a second preferred embodiment of the present invention.

FIG. 3 is a vertical cross-sectional view of a disk drive apparatus 1 according to a second preferred embodiment of the present invention. The disk drive apparatus preferably is an apparatus configured to rotate a disk, for example. The disk is, for example, a magnetic disk. The disk drive apparatus 1 according to the present preferred embodiment is an apparatus configured to perform reading and writing of information from or to a magnetic disk 12 while rotating the magnetic disk 12.

Referring to FIG. 3, the disk drive apparatus 1 preferably includes a spindle motor 11, the magnetic disk 12, an access portion 13, a base plate 2, and a top cover 3.

The spindle motor 11 is configured to rotate the magnetic disk 12 about a rotation axis 9 while supporting the magnetic disk 12. The spindle motor 11 preferably includes a stationary portion 6, which includes a bearing holding portion 61, and a rotating portion 7. The bearing holding portion 61 is a portion of the base plate 2, and is defined integrally with a remaining portion of the base plate 2. The detailed structure of the spindle motor 11 will be described below.

The magnetic disk 12 is supported by the rotating portion 7 of the spindle motor 11. Once the spindle motor 11 is driven, the magnetic disk 12 is caused to rotate together with the rotating portion 7. Note that the disk drive apparatus 1 may include two or more magnetic disks 12.

The access portion 13 is configured to move heads 131 along recording surfaces of the magnetic disk 12 to perform the reading and writing of information from or to the magnetic disk 12. Note that the access portion 13 may be configured to perform only one of the reading and writing of information from or to the magnetic disk 12.

The base plate 2 preferably includes a bottom portion and a wall portion 22. The bottom portion 21 extends in directions perpendicular or substantially perpendicular to the rotation axis 9. The bottom portion 21 includes the bearing holding portion 61 of the spindle motor 11. The wall portion 22 is arranged radially outward of the magnetic disk 12 and the access portion 13, and extends upward from an outer circumferential portion of the bottom portion 21. In addition, the wall portion 22 surrounds the bottom portion 21. Referring to FIG. 3, the base plate 2 includes an upper opening 20. The base plate 2 is obtained, for example, by casting a metal such as an aluminum alloy. Note, however, that the base plate 2 may be produced by another process, such as a cutting process or press working. Also note that the base plate 2 may alternatively be defined by a plurality of members, if so desired.

The top cover 3 is arranged to cover the upper opening 20 of the base plate 2. That is, the top cover 3 is arranged to close an upper side of the base plate 2. The base plate 2 and the top cover 3 are arranged to together define a case. The rotating portion 7 of the spindle motor 11, the magnetic disk 12, and the access portion 13 are preferably accommodated in an interior of the case.

The upper opening 20 of the base plate 2 is hermetically sealed with the top cover 3 in order to maintain cleanliness inside the case. A gasket 4 is arranged on a lower surface of the top cover 3 to provide the hermetic sealing. The gasket 4 is brought into contact with a surface of the base plate 2 around the upper opening 20 of the base plate 2. Specifically, the gasket 4 is brought into contact with an upper end portion of the wall portion 22 of the base plate 2. This makes it difficult for gas to enter into or exit out from the case. The detailed structure of the top cover 3 will be described below.

Next, the detailed structure of the spindle motor 11 will now be described below.

Referring to FIG. 3, the spindle motor 11 includes the stationary portion 6 and the rotating portion 7. The stationary portion 6 is arranged to be stationary relative to the base plate 2 and the top cover 3. The rotating portion 7 is supported to be rotatable with respect to the stationary portion 6. The rotating portion 7 is arranged to rotate about the rotation axis 9 while supporting the magnetic disk 12. Note that the spindle motor 11 may be, for example, either a three-phase brushless motor or a motor of another type.

The stationary portion 6 according to the present preferred embodiment preferably includes the bearing holding portion 61, a stator 62, and a bearing unit 63.

The bearing holding portion 61 extends in the directions perpendicular to the rotation axis 9 on a lower side of the rotating portion 7, the magnetic disk 12, and the access portion 13. In addition, as mentioned above, the bearing holding portion 61 is a portion of the base plate 2.

The stator 62 preferably includes a stator core 81 and a plurality of coils 82. The stator core 81 and the coils 82 are arranged above the bearing holding portion 61. The stator core 81 is preferably defined by, for example, laminated steel sheets, that is, electromagnetic steel sheets, such as silicon steel sheets, placed one upon another in the axial direction. The stator core 81 preferably includes an annular core back 811 and a plurality of teeth 812. An inner circumferential surface of the core back 811 is fixed to the bearing holding portion 61. The teeth 812 project radially outward from the core back 811. Each coil 82 is defined by a conducting wire wound around a separate one of the teeth 812.

The bearing unit 63 is arranged to accommodate a lower end portion of a shaft 71, and is also arranged to cover a lower end surface of the shaft 71. That is, the bearing unit 63 preferably includes a bottom and is cylindrical or substantially cylindrical in shape. In addition, the bearing unit 63 is accommodated radially inside the bearing holding portion 61, and is fixed to the bearing holding portion 61. Note that the bearing unit 63 may be defined either by a plurality of members as illustrated in FIG. 3 or by a single member.

The rotating portion 7 preferably includes the shaft 71, a hub 72, and a magnet 73.

The shaft 71 is a columnar member extending in the axial direction. A metal, such as a ferromagnetic or nonmagnetic stainless steel, for example, is preferably used as a material of the shaft 71. As described above, the lower end portion of the shaft 71 is accommodated inside the bearing unit 63. An upper end portion of the shaft 71 is arranged to project above an upper end of the bearing unit 63.

The hub 72 extends radially outward from a periphery of the upper end portion of the shaft 71. An inner circumferential surface of the hub 72 is fixed to the upper end portion of the shaft 71. The hub 72 includes a disk mount portion 721 at an outer edge portion thereof. As illustrated in FIG. 3, the magnetic disk 12 is mounted on the disk mount portion 721, and is fixed to the hub 72 preferably through a clamper (not shown).

A lubricating fluid is arranged between the bearing unit 63 and a combination of the shaft 71 and the hub 72. A polyester oil or a diester oil, for example, is preferably used as the lubricating fluid. The shaft 71 is supported through the lubricating fluid to be rotatable with respect to the bearing unit 63. This allows the rotating portion 7 to rotate about the rotation axis 9.

The magnet 73 is preferably fixed to the hub 72 radially outside the stator 62. The magnet 73 according to the present preferred embodiment preferably is annular or substantially annular in shape. An inner circumferential surface of the magnet 73 is arranged radially opposite a radially outer end surface of each of the teeth 812. The inner circumferential surface of the magnet 73 preferably includes north and south poles arranged to alternate with each other in a circumferential direction.

Note that a plurality of magnets may be used in place of the annular magnet 73, if so desired. In the case where the plurality of magnets are used, the magnets are arranged in the circumferential direction such that north and south poles alternate with each other.

Regarding the spindle motor 11 as described above, once drive currents are supplied to the coils 82, magnetic flux is generated around the teeth 812. Then, interaction between the magnetic flux of the teeth 812 and that of the magnet 73 produces a circumferential torque, so that the rotating portion 7 is caused to rotate about the rotation axis 9 with respect to the stationary portion 6. The magnetic disk 12 supported by the hub 72 is caused to rotate about the rotation axis 9 together with the rotating portion 7.

Figure 4:
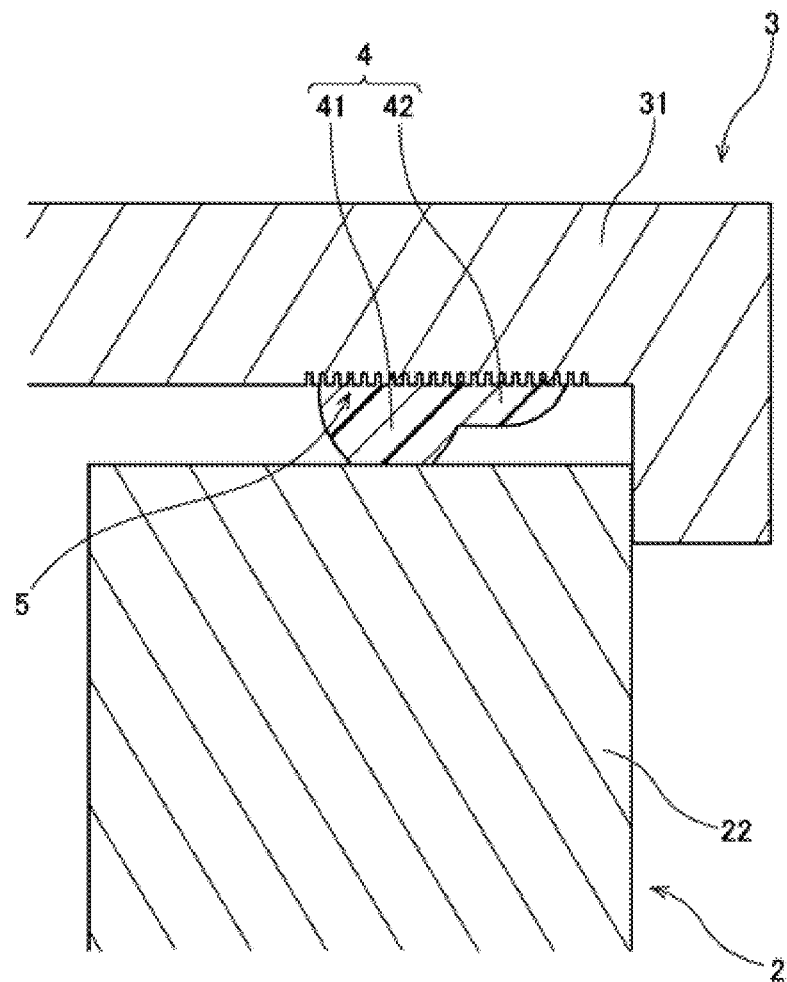
FIG. 4 is a partial vertical cross-sectional view of the disk drive apparatus according to the second preferred embodiment of the present invention.
Figure 5:
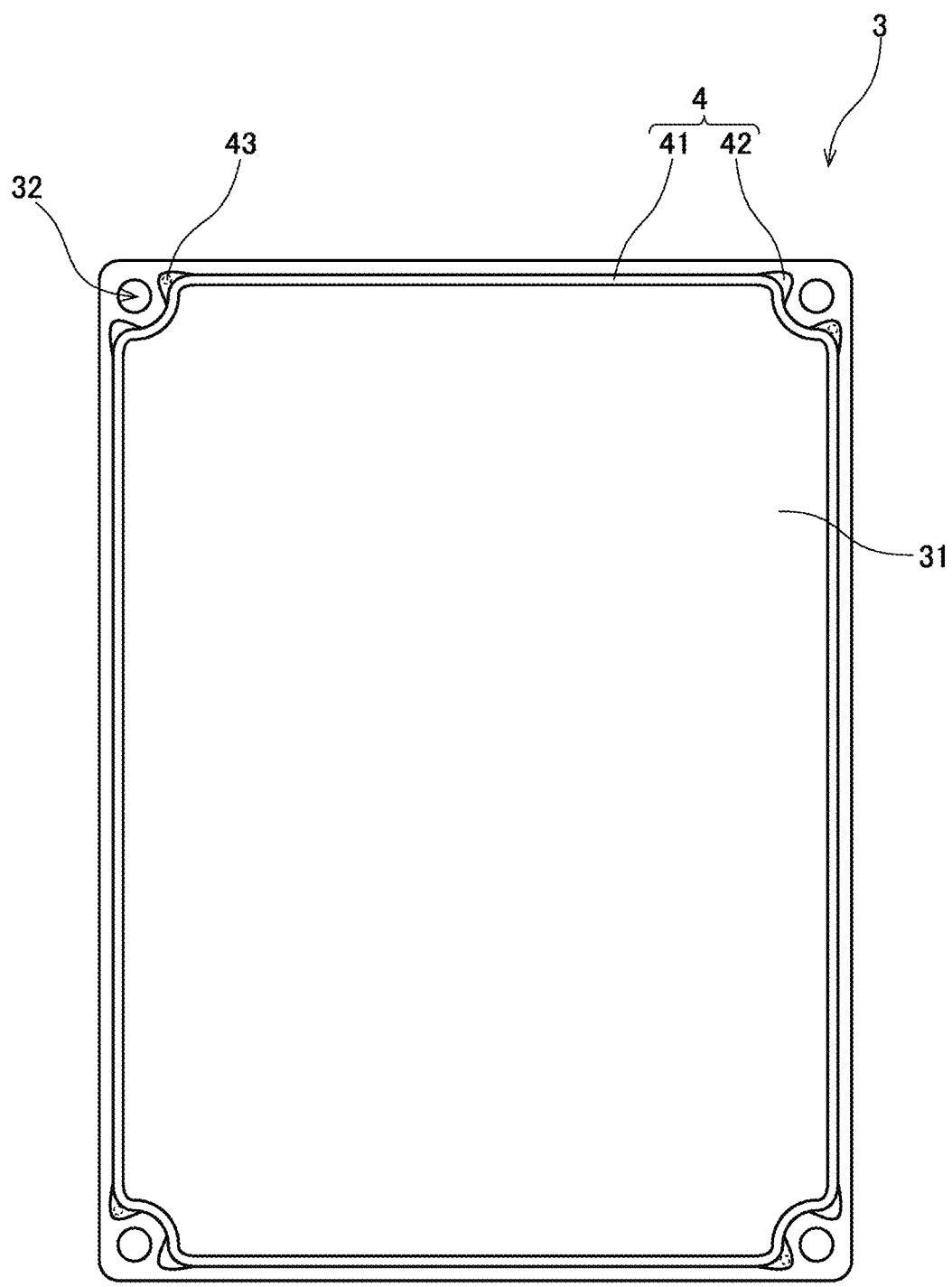
FIG. 5 is a bottom view of a top cover according to the second preferred embodiment of the present invention.
Figure 6:
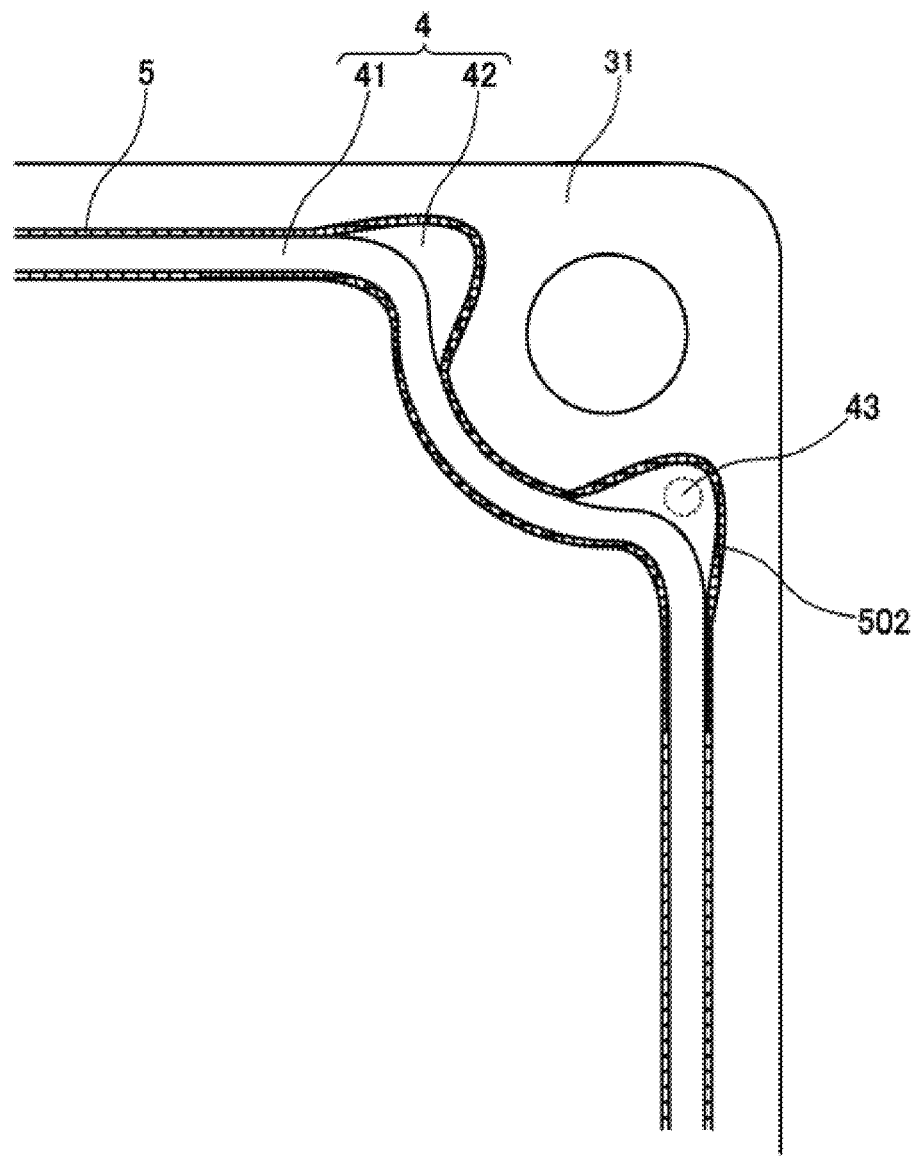
FIG. 6 is a partial bottom view of a plate of the top cover according to the second preferred embodiment of the present invention.
Figure 7:
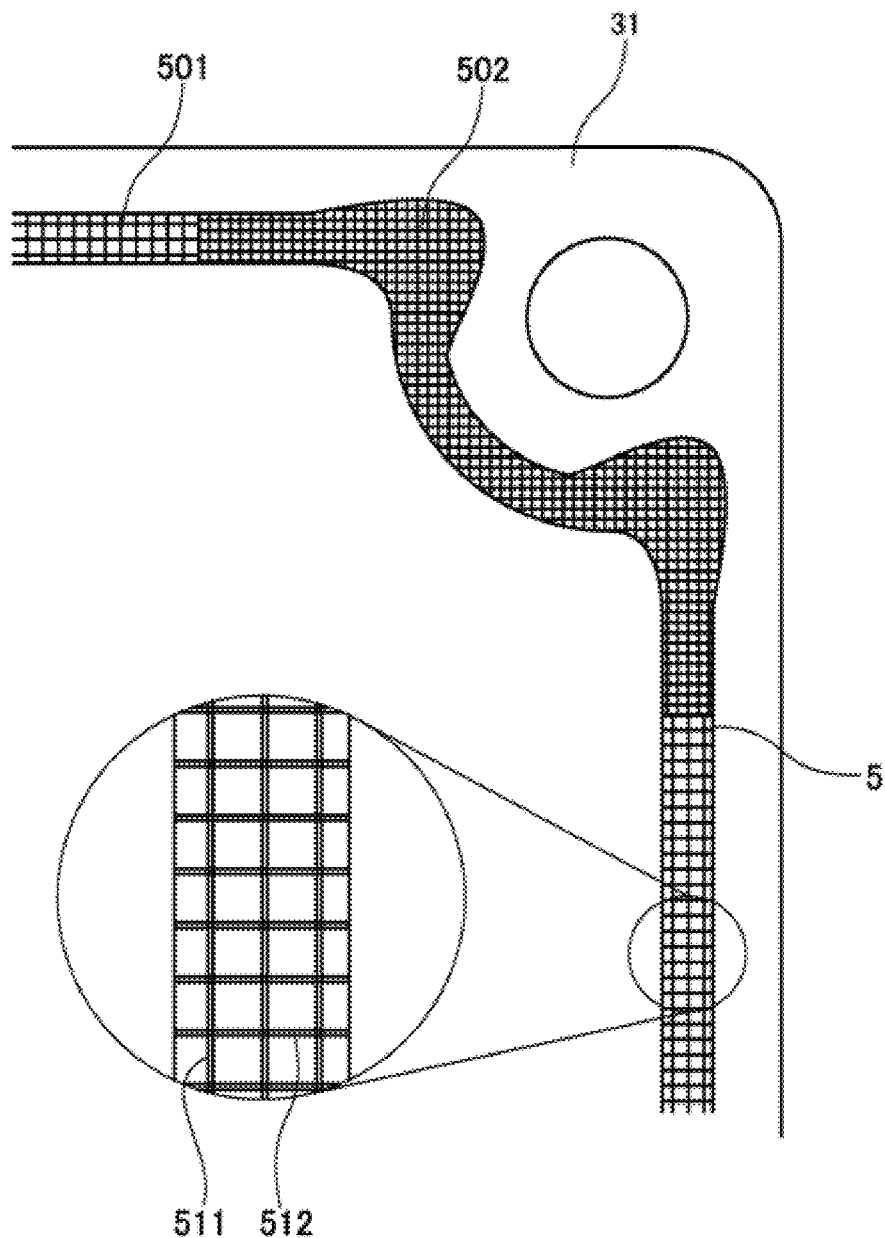
FIG. 7 is a partial bottom view of the top cover according to the second preferred embodiment of the present invention.
Figure 8:
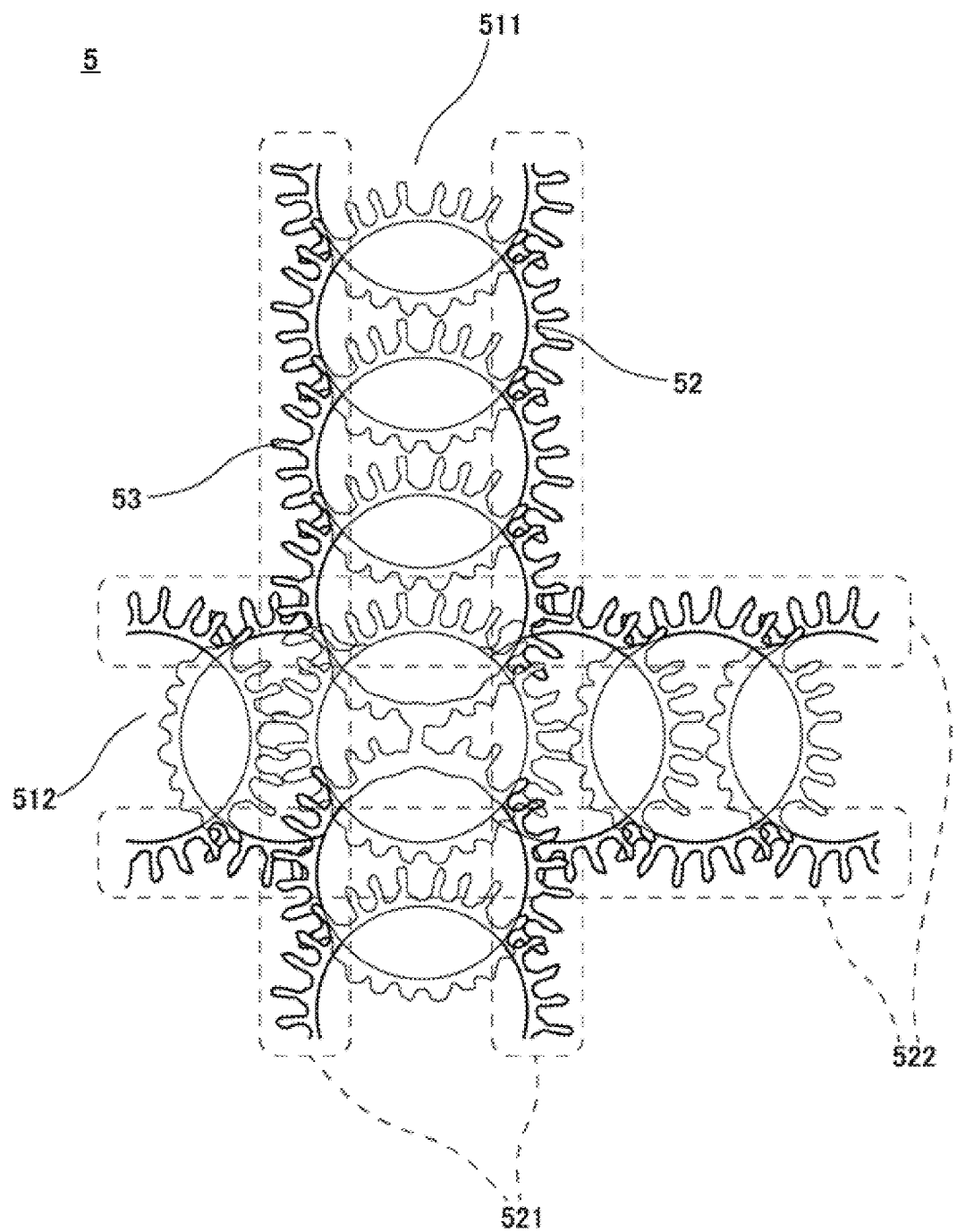
FIG. 8 is a partial bottom view of a fixing region of the plate according to the second preferred embodiment of the present invention.
Figure 9:
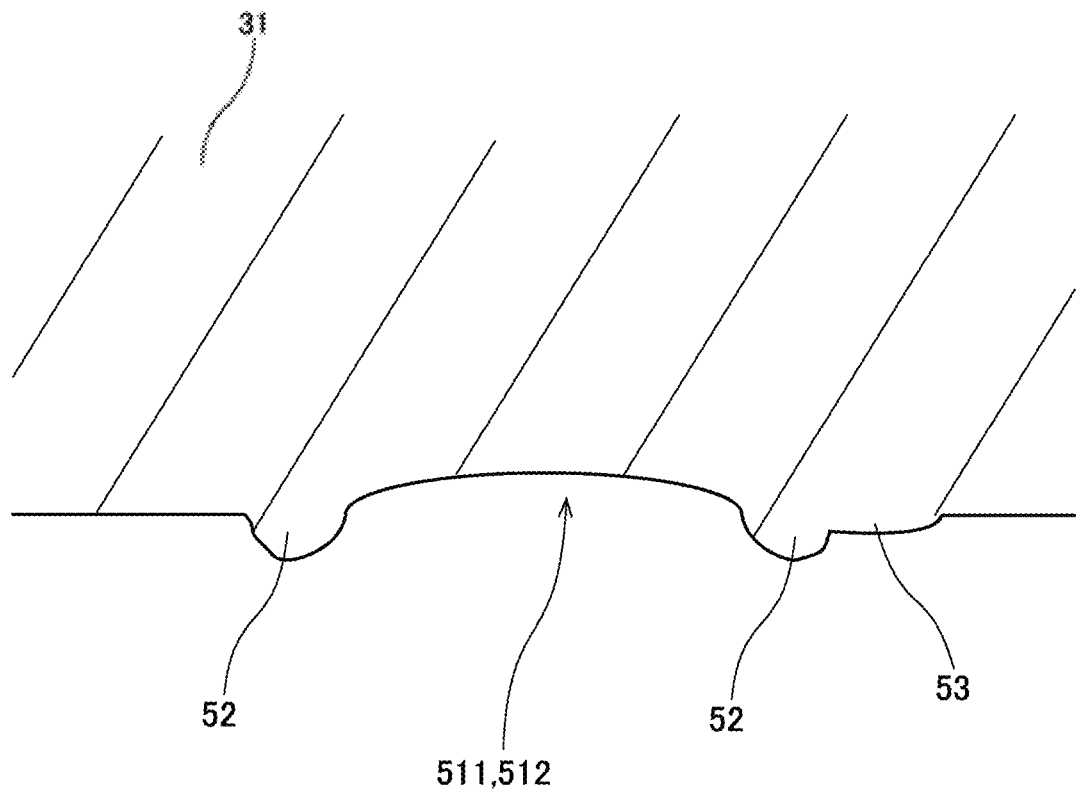
FIG. 9 is a partial vertical cross-sectional view of the fixing region of the plate according to the second preferred embodiment of the present invention.

Next, the detailed structure of the top cover 3 used in the disk drive apparatus 1 will now be described below. FIG. 4 is a partial vertical cross-sectional view of the disk drive apparatus 1. FIG. 5 is a bottom view of the top cover 3. FIG. 6 is a partial bottom view of a plate 31 defining a portion of the top cover 3. FIG. 7 is a partial bottom view of the top cover 3. FIG. 8 is a partial bottom view of a fixing region 5 of the plate 31. FIG. 9 is a partial vertical cross-sectional view of the fixing region 5 of the plate 31.

Referring to FIGS. 4 and 5, the top cover 3 includes the plate 31 and a gasket 4. The top cover 3 is preferably square, substantially square, rectangular or substantially rectangular in a plan view.

The plate 31 is preferably, for example, a plate-shaped member made of a metal, such as aluminum. Referring to FIGS. 4 and 6, the plate 31 includes the fixing region 5 in a lower surface thereof. The fixing region 5 is arranged to extend along an outer edge of the plate 31 in the lower surface of the plate 31.

The gasket 4 is preferably made of, for example, an elastomer, and is fixed to the lower surface of the plate 31. The gasket 4 is preferably made of a thermoplastic elastomer, but may be made of a thermosetting elastomer. Referring to FIGS. 4 and 7, the gasket 4 is closely adhered to the fixing region 5 of the plate 31. In addition, the gasket 4 extends along an outer edge of the top cover 3. In the present preferred embodiment, the gasket 4 is preferably obtained by, for example, an injection molding process. Note that the gasket 4 may be produced by any other desirable method. For example, the gasket 4 may be molded by applying a molten resin to the lower surface of the plate 31 with a dispenser, if so desired.

Referring to FIG. 4, the gasket 4 is brought into contact with an upper surface of the wall portion 22 of the base plate 2. This allows a space inside the gasket 4 to be hermetically sealed between the base plate 2 and the top cover 3. That is, the interior space of the case defined by the base plate 2 and the top cover 3 is hermetically sealed between the base plate 2 and the top cover 3.

Referring to FIG. 5, the top cover 3 preferably includes screw holes 32 each of which is arranged to pass through the plate 31 in the vertical direction. The top cover 3 is preferably fixed to the base plate 2 with, for example, screws (not shown) inserted into the screw holes 32. As a result, as illustrated in FIG. 4, the gasket 4 arranged on the lower surface of the top cover 3 is pressed against the upper surface of the wall portion 22 of the base plate 2, and the gasket 4 is crushed in the axial direction. This results in an increase in an effect of the sealing by the gasket 4. That is, the hermetic sealing of the space inside the gasket 4 becomes more secure.

Referring to FIGS. 8 and 9, the fixing region 5 preferably includes ridges 52 and a plurality of filamentous projections 53. Each filamentous projection 53 is preferably an elongated projection extending from a corresponding one of the ridges 52 along the lower surface of the plate 31. The fixing region 5 preferably includes a plurality of such ridges 52. A surface shape of the fixing region 5 becomes irregular and non-uniform by the plurality of ridges 52 and the plurality of filamentous projections 53 being distributed over the fixing region 5. That is, a surface area of the fixing region 5 is increased. As a result, the fixing region 5 and the gasket 4 illustrated in FIG. 4 are mechanically joined to each other through an anchor effect. The gasket 4 is thus fixed to the plate 31.

As described above, the gasket 4 is fixed to the plate without use of an adhesive. When no adhesive is used, outgassing from an adhesive will not occur. Accordingly, a decrease in cleanliness of the interior space of the case defined by the base plate 2 and the top cover 3 due to outgassing also does not occur.

In the present preferred embodiment, at least some of the ridges 52 are arranged to overlap with one another. As a result, rows of the ridges 52 are defined. Referring to FIG. 8, a plurality of ridges 52 are preferably arranged to overlap with one another in a first direction to define two first rows 521 each of which is arranged to extend in the first direction. In other words, the fixing region 5 includes the first rows 521 defined by the plurality of ridges 52 overlapping with one another, and each first row 521 is arranged to extend in the first direction. Referring to FIG. 9, an area between the two first rows 521 defines a first groove 511. In the case where the gasket 4 is produced by the injection molding process, the groove defined by the rows of ridges 52 makes it easier for any gas remaining between a material of the gasket 4 and the fixing region 5 to escape when the gasket 4 is molded. As a result, the gasket 4 is closely adhered to the fixing region 5. That is, the gasket 4 is more securely fixed to the plate 31.

Similarly, a plurality of ridges 52 are arranged to overlap with one another in a second direction to define two second rows 522 each of which is arranged to extend in the second direction. In other words, the fixing region 5 includes the second rows 522 defined by the plurality of ridges 52 overlapping with one another, and each second row 522 is arranged to extend in the second direction. Referring to FIG. 9, an area between the two second rows 522 preferably defines a second groove 512. Note here that the second direction is a direction different from the first direction. The first rows 521 and the second rows 522 are arranged to cross each other. That is, the first groove 511 and the second groove 512 are arranged to cross each other. In each of FIGS. 6 and 8, the vertical direction corresponds to the first direction, while a horizontal direction corresponds to the second direction. Note, however, that this is not essential to the present invention and any other desired arrangement could be used.

In the present preferred embodiment, in a process of defining the fixing region 5, the lower surface of the plate 31 is spot-irradiated with laser beams to define the ridges 52. As described above with reference to the first preferred embodiment, the ridges 52 are defined in the annular or substantially annular shape when positions which do not overlap with one another are spot-irradiated with the laser beams. In the present preferred embodiment, positions which overlap with one another are spot-irradiated with the laser beams one after another to define the rows of ridges 52 as illustrated in FIG. 8.

Suppose, for example, that the spot irradiation with the laser beams is performed such that a position to be spot-irradiated with the laser beam is shifted one by one in the first direction. In this case, a portion of a previously defined annular ridge, the portion overlapping with a next position to be spot-irradiated with the laser beam, becomes indefinite in ridge shape once the next position is irradiated with the laser beam. Portions of the previously defined annular ridge, each of the portions extending in the first direction, do not overlap with the next position to be spot-irradiated with the laser beam, and therefore keep their ridge shape. This is repeated to define the two first rows 521, each of which is a row of ridges 52 extending in the first direction. Then, the first groove 511 is defined between the two first rows 521.

Figure 10:
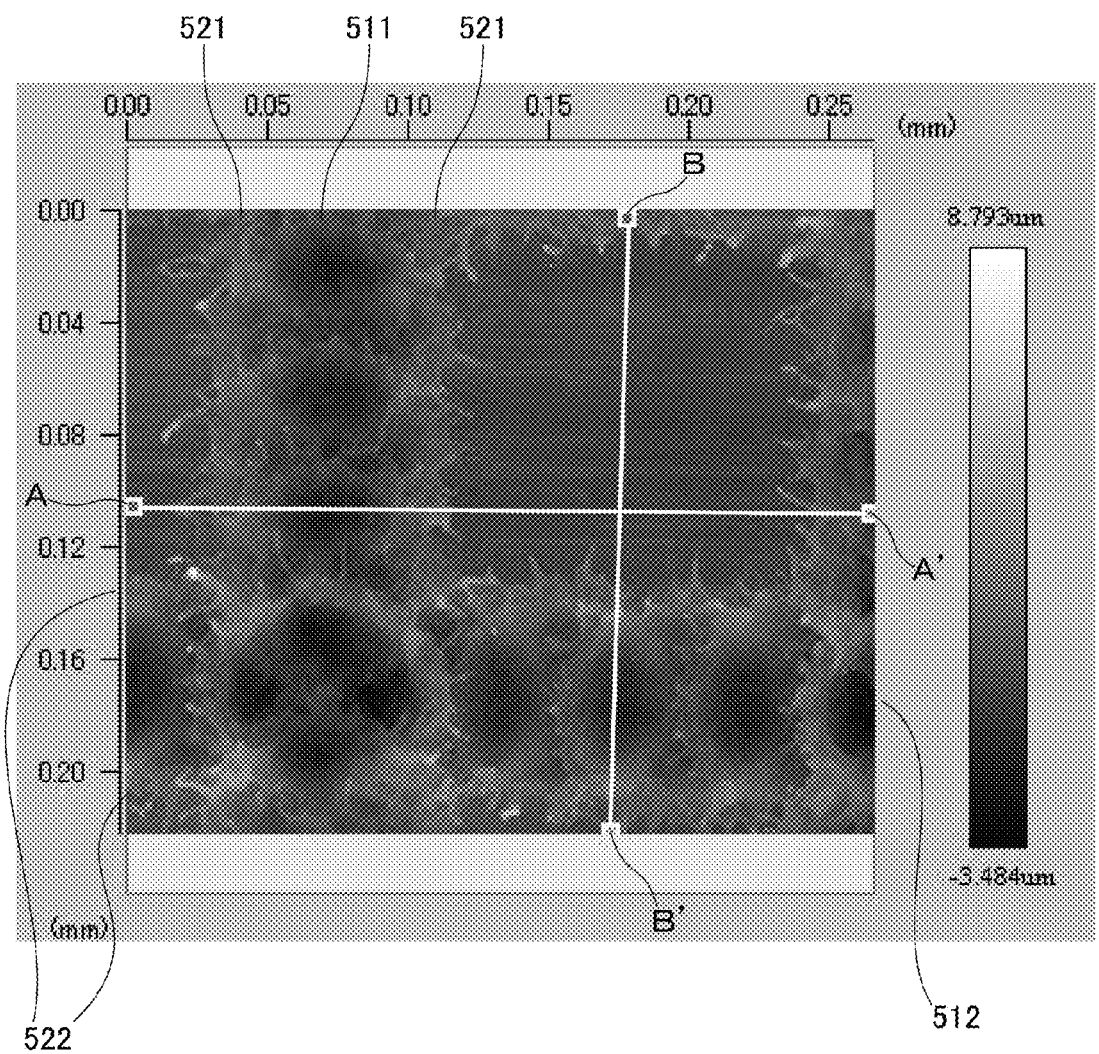
FIG. 10 is a diagram illustrating a result of measurement of a surface shape of the fixing region of the plate according to the second preferred embodiment of the present invention.

Here, the plate 31 according to the present preferred embodiment has been created and the shape of the fixing region 5 of the produced plate 31 has been measured. FIG. 10 is a diagram illustrating a result of the measurement of the surface shape thereof. In FIG. 10, white portions represent portions which rise downward from the surface of the plate 31. The lighter the color becomes, the greater the extent to which the portion rises downward from the surface of the plate 31 becomes. Similarly, in FIG. 10, black portions represent portions which are recessed upward from the surface of the plate 31. The darker the color becomes, the greater the extent to which the portion is recessed upward from the surface of the plate 31 becomes.

Figure 11:
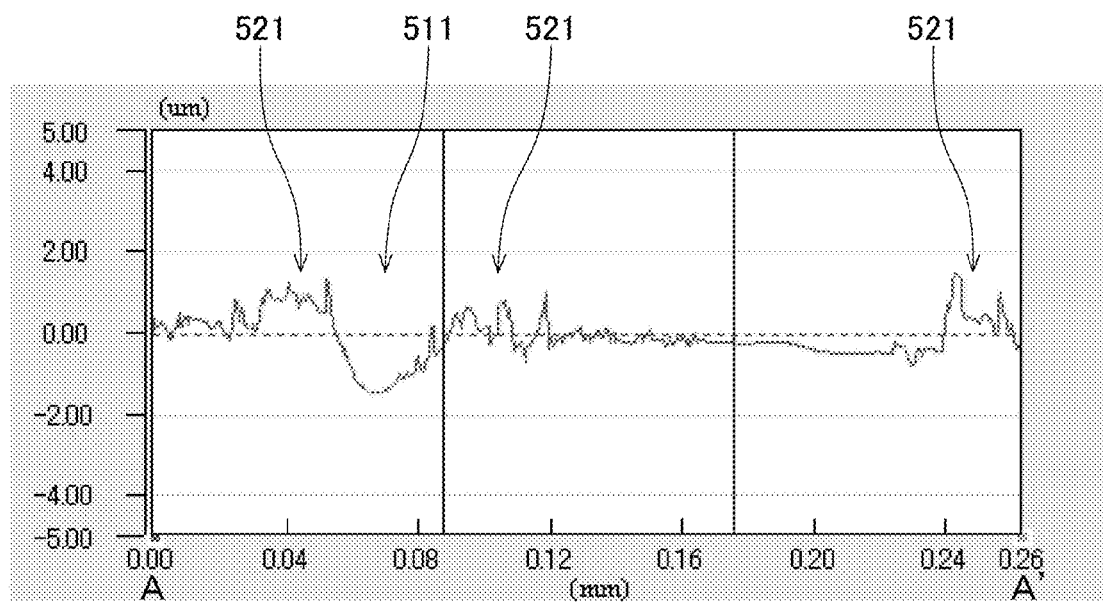
FIG. 11 is a diagram illustrating a surface profile of a section of the plate according to the second preferred embodiment of the present invention taken along line A-A' in FIG. 10.
Figure 12:
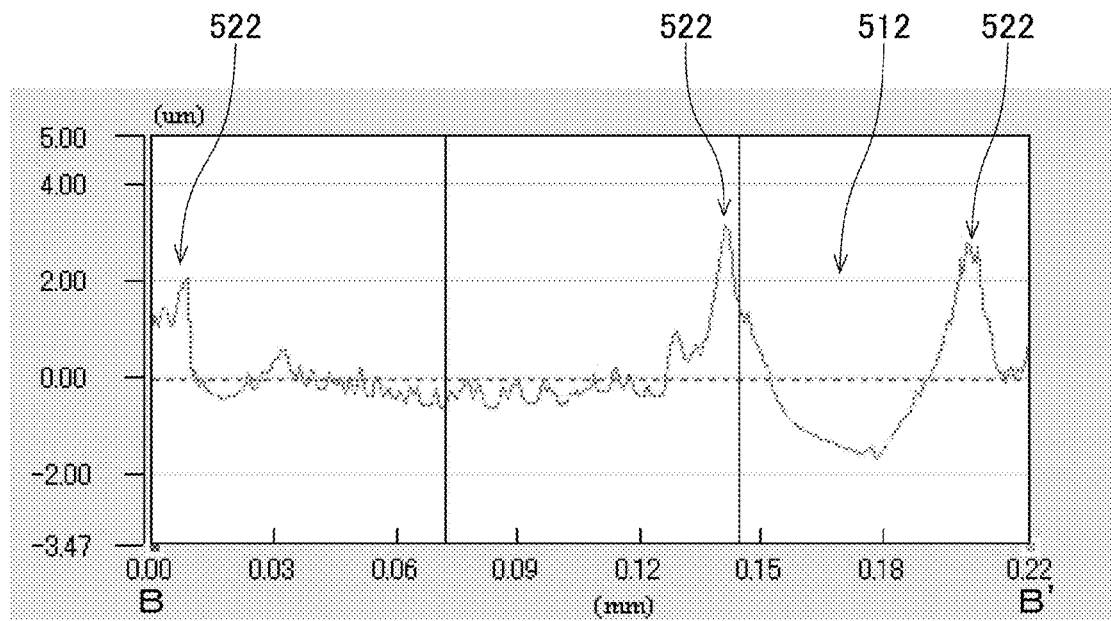
FIG. 12 is a diagram illustrating a surface profile of a section of the plate according to the second preferred embodiment of the present invention taken along line B-B' in FIG. 10.

FIG. 11 is a diagram illustrating a surface profile of a section of the plate 31 taken along line A-A' in FIG. 10. FIG. 12 is a diagram illustrating a surface profile of a section of the plate 31 taken along line B-B' in FIG. 10. Note that, in each of FIGS. 11 and 12, along a vertical axis, positive values represent the portions which rise downward, while negative values represent the portions which are recessed upward. Also note that, in each of FIGS. 11 and 12, the vertical axis and a horizontal axis have different scales.

FIG. 11 shows that the first groove 511 is defined between the two first rows 521, while FIG. 12 shows that the second groove 512 is defined between the two second rows 522. In FIG. 11, three of the first rows 521 and one of the first grooves 511 are recognized. The extent to which each of the three first rows 521 rises downward from the surface of the plate 31 preferably is in the range of about 1 μm to about 1.5 μm, for example. The extent to which the first groove 511 is recessed upward from the surface of the plate 31 preferably is about 1.5 μm, for example. In FIG. 12, three of the second rows 522 and one of the second grooves 512 are recognized. The extent to which each of the three second rows 522 rises downward from the surface of the plate 31 preferably is in the range of about 1 μm to about 3 μm, for example. The extent to which the second groove 512 preferably is recessed upward from the surface of the plate 31 is about 1.5 μm, for example.

Comparison of FIGS. 11 and 12 shows that the extent to which each ridge rises downward is uneven. Note that the depth of each groove and the height of each row are not limited to the values according to the present preferred embodiment, but may be modified appropriately.

In FIG. 10, a position at which the first groove 511 and the second groove 512 intersect with each other is represented by a color darker than other positions in the first groove 511 and the second groove 512. This is because the position at which the first groove 511 and the second groove 512 intersect with each other is irradiated with the laser beams both when the first groove 511 is defined and also when the second groove 512 is defined, and is therefore recessed to a greater extent than the other positions. At such a position, a contour of the ridge is sometimes emphasized and defined in the annular shape. In addition, the rows of ridges may include an annular ridge defined at another position due to the aforementioned unevenness of the ridges or various conditions when the irradiation with the laser beams is performed.

Referring to FIG. 7, the number of first grooves 511, each of which extends in the first direction, and the number of second grooves 512, each of which extends in the second direction, included in the fixing region 5 according to the present preferred embodiment are both more than one. Intersection of the first and second grooves 511 and 512 as illustrated in FIG. 7 makes a surface shape of the plate 31 more irregular and non-uniform. This causes the gasket 41 to be more securely fixed to the plate 31.

Moreover, referring to FIG. 5, the gasket 4 according to the present preferred embodiment includes a body portion 41 and projecting portions 42. The width of the body portion 41 as measured in a direction perpendicular to the outer edge of the top cover 3 preferably is configured to be uniform or substantially uniform. Referring to FIG. 4, each projecting portion 42 is preferably arranged to project from a side surface of the body portion 41 toward an outer circumference of the plate 31 along the surface of the plate 31. Each of the body portion 41 and the projecting portions 42 is arranged to be in contact with the fixing region 5. Therefore, a surface of contact between the gasket 4 and the fixing region 5 is wide in the vicinity of each projecting portion 42. That is, an area of contact between the gasket 4 and the fixing region 5 is preferably locally expanded in the vicinity of each projecting portion 42. Strength with which the gasket 4 and the plate 31 are fixed to each other is thus improved in the vicinity of each projecting portion 42.

Referring to FIGS. 5 and 7, in the present preferred embodiment, each projecting portion 42 is arranged outside a bending portion of the body portion 41. The strength with which the gasket 4 and the plate 31 are fixed to each other is thus improved at the bending portion, where the gasket 4 comes off the plate 31 relatively easily.

As described above, the gasket 4 according to the present preferred embodiment is preferably produced by, for example, an injection molding process. Therefore, the gasket 4 includes a gate mark 43, at which a gate portion of a mold is located at the time of the injection molding process. As illustrated in FIG. 6, the gate mark 43 is preferably arranged in one of the projecting portions 42. When the gasket 4 is produced by the injection molding process, a force is applied to a position near the gate portion at the time of release of the mold. Therefore, the gasket 4 comes off the plate 31 relatively easily in the vicinity of the gate mark 43 at the time of the release of the mold. The likelihood that the gasket 4 will come off the plate 31 at the time of the release of the mold is reduced by arranging the gate portion in the projecting portion at which the gasket 4 and the plate 31 are fixed to each other with great strength.

Referring to FIG. 4, in the present preferred embodiment, each projecting portion 42 preferably has an axial thickness smaller than that of the body portion 41. In addition, a lower surface of the projecting portion 42 is arranged at a level higher than that of a lower surface of the body portion 41. When the gate mark (not shown in FIG. 4) is located in the lower surface of the projecting portion 42 as described above, a contact of the gate mark (not shown in FIG. 4) with the upper surface of the wall portion 22 is prevented.

Referring to FIG. 7, the fixing region 5 according to the present preferred embodiment preferably includes a first rugged portion 501 and a second rugged portion 502. A distribution density of the ridges in the first rugged portion 501 is defined as a first density, and a distribution density of the ridges in the second rugged portion 502 is defined as a second density. Then, the second density preferably is greater than the first density. Specifically, a spacing between every adjacent first grooves 511 and a spacing between every adjacent second grooves 512 are both smaller in the second rugged portion 502 than in the first rugged portion 501. That is, the second rugged portion 502 has a greater surface area per unit area than the first rugged portion 501. The second rugged portion 502 is arranged near the bending portions of the body portion 41 where the gasket 4 comes off the plate 31 relatively easily. The second rugged portion 502 may be arranged not only at the bending portions but also at any position where a greater strength with which the gasket 4 is fixed to the plate 31 is desired. This leads to an additional improvement in the strength with which the plate 31 and the gasket 4 are fixed to each other at the position where a greater fixing strength is desired.

Referring to FIG. 7, in the present preferred embodiment, the projecting portions 42 and portions of the body portion 41 near the projecting portions 42 are arranged to be in contact with the second rugged portion 502. This leads to an additional reduction in the likelihood that the gasket 4 will come off the plate 31 in the vicinity of any projecting portion 42.

Moreover, referring to FIGS. 4 and 6, in the present preferred embodiment, the fixing region 5 preferably has a width greater than that of the gasket 4. This reduces the likelihood that any gas bubble will remain between the plate 31 and the gasket 4, because each of the first and second grooves 511 and 512 of the fixing region 5 serves as a channel permitting the escape of gas generated when the gasket 4 is molded. This makes it easier for the gasket 4 to be closely adhered to the plate 31. That is, a reduction in a decrease in the strength with which the gasket 4 is fixed to the plate 31 is achieved.

Figure 13:
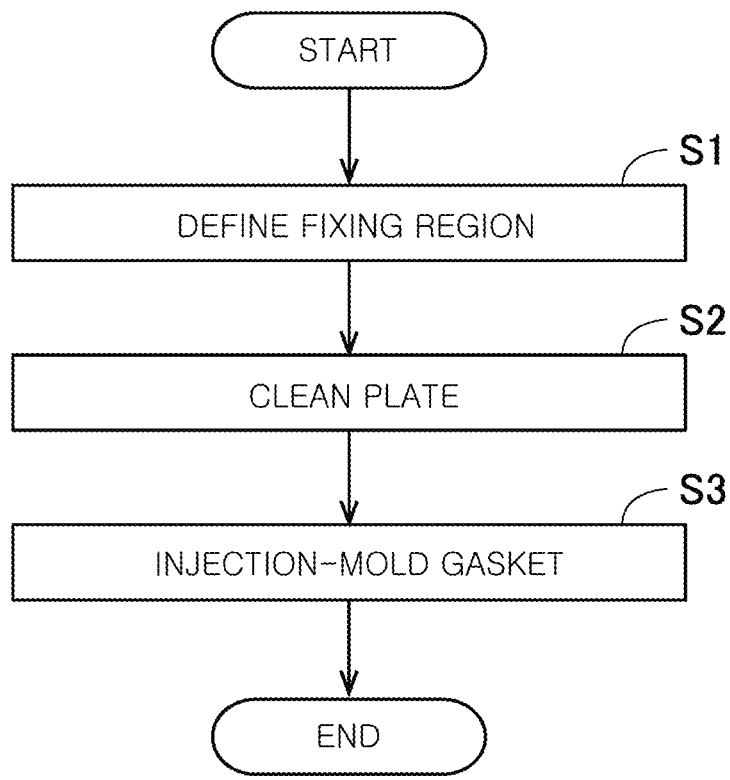
FIG. 13 is a flowchart illustrating a portion of a procedure of a process of manufacturing the top cover according to the second preferred embodiment of the present invention.

FIG. 13 is a flowchart illustrating a portion of a preferred embodiment of a process of manufacturing the top cover 3 described above. The process of manufacturing the top cover 3 will now be described below with reference to FIGS. 7, 8, and 13.

First, the fixing region 5 including the plurality of ridges 52 and the plurality of filamentous projections 53 are defined in the surface of the plate 31 (step S1). In other words, the process of manufacturing the top cover 3 includes a step a) of defining the fixing region 5 including the plurality of ridges 52 and the plurality of filamentous projections 53. Specifically, the spot irradiation of the lower surface of the plate 31 with the laser beam is preferably repeated to define the plurality of ridges 52. The plurality of filamentous projections 53 extending from each of the ridges 52 are defined together with the ridges 52. The surface shape of the fixing region 5 is thus irregular and non-uniform, so that the surface area of the fixing region 5 is increased.

In the present preferred embodiment, the spot irradiation with the laser beam is preferably repeated such that the position to be spot-irradiated with the laser beam is shifted one by one, so that the rows of ridges 52 are defined with the first and second grooves 511 and 512.

While the laser beams are used to define the ridges 52 and the filamentous projections 53 in the fixing region 5 according to the present preferred embodiment, this is not essential to the present invention. For example, the ridges 52 and the filamentous projections 53 may alternatively be defined by any desirable method such as press working, electrochemical machining, etc.

Next, the plate 31 is cleaned (step S2). In other words, the process of manufacturing the top cover 3 includes a step b) of cleaning the plate 31 after the step a). Matter adhered to the surface of the plate 31 is thus removed. As a result, a reduction in the strength with which the gasket 4 is fixed to the plate 31 due to the matter adhered to the surface of the plate 31 is prevented.

According to the present preferred embodiment, an acid cleaning fluid is preferably used to clean the surface of the plate 31. Note that water, a cleaner containing a surface-active agent, or the like may alternatively be used as the cleaning fluid. Also note that ultrasonic cleaning may be used to clean the plate 31 at step S2. In this case, the plate 31 is preferably, for example, immersed in a liquid, such as water, containing an organic solvent or a surface-active agent, and ultrasonic wave vibration is applied to the liquid, such that the matter adhered to the surface of the plate 31 is removed.

Next, the gasket 4 is injection-molded on the plate 31 (step S3). In other words, the process of manufacturing the top cover 3 preferably includes a step c) of injection-molding the gasket 4 on the plate 31 after the step b). Specifically, the mold is arranged on the lower surface of the plate 31. At this time, the gate portion of the mold is arranged at a position at which one of the projecting portions 52 is to be defined after the gasket 4 is molded, as described above. Then, the molten resin is injected into a space surrounded by the mold and the lower surface of the plate 31 through the gate portion. As a result, the molten resin comes into even contact with a rugged portion of a surface of the fixing region 5 of the plate 31. At this time, the molten resin enters into the first and second grooves 511 and 512 in the fixing region 5. Moreover, the ridges and the filamentous projections 53 are enveloped in the molten resin.

Next, the molten resin is cured. As a result, the gasket 4 is obtained. Once the molten resin is cured, the gasket 4 is closely adhered to the fixing region 5. Then, the mold is separated from the gasket 4 after the curing.

As described above, the gasket 4 is injection-molded on the surface of the fixing region 5, so that the gasket 4 is closely adhered to the fixing region 5. In other words, the gasket 4 is closely adhered to the fixing region 5 in the step c). The surface shape of the fixing region 5 becomes irregular and non-uniform at step S1, so that the surface area of the fixing region 5 is increased. Thus, the gasket 4 and the fixing region 5 are mechanically joined to each other through the anchor effect. As a result, the gasket 4 is securely fixed to the plate 31.

Accordingly, the gasket 4 is fixed to the plate 31 without use of an adhesive.

While preferred embodiments of the present invention have been described above, it will be understood that the present invention is not limited to the above-described preferred embodiments.

Figure 14:
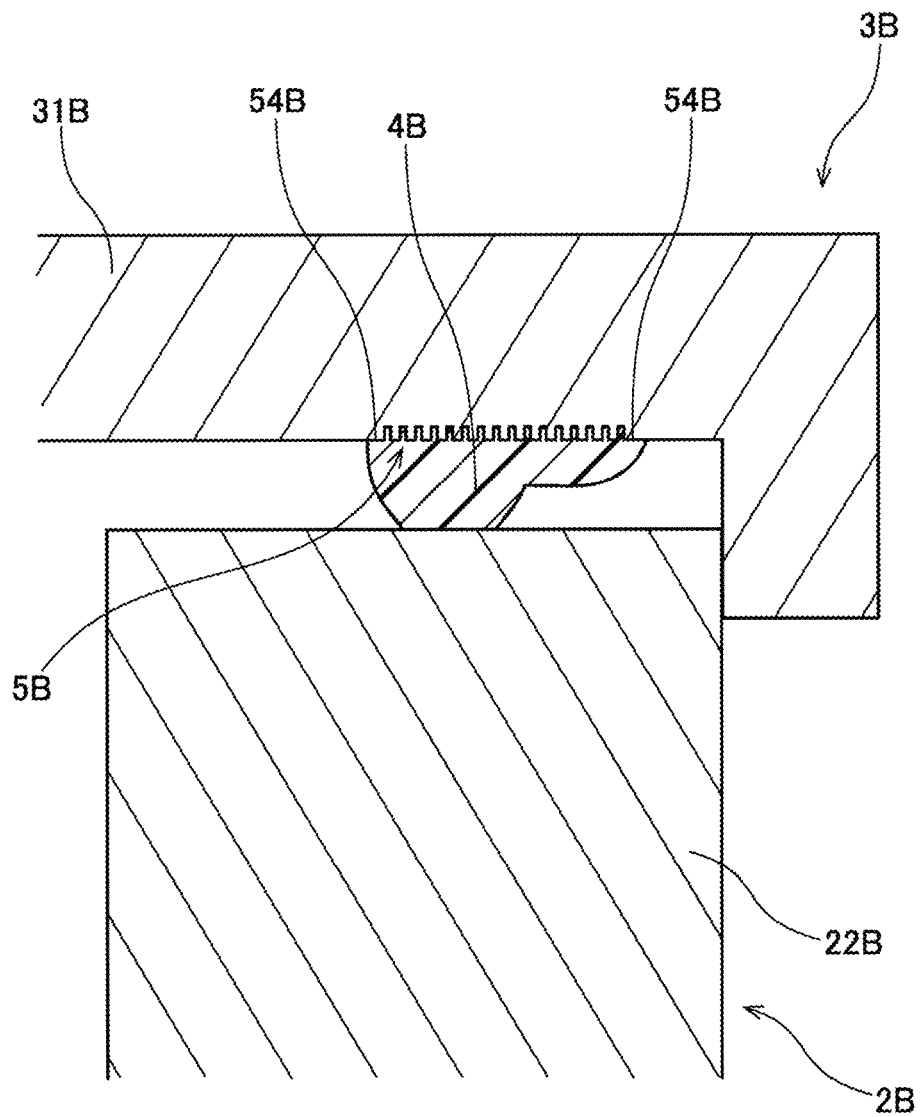
FIG. 14 is a partial vertical cross-sectional view of a disk drive apparatus according to a modification of the second preferred embodiment of the present invention.

FIG. 14 is a partial vertical cross-sectional view of preferred embodiment of a disk drive apparatus according to a modification of the second preferred embodiment. In the modification illustrated in FIG. 14, a fixing region 5B preferably has a width smaller than that of a gasket 4B. As a result, portions of a lower surface of a plate 31B which are adjacent to the fixing region 5B are flat contact surfaces 54B. Each flat contact surface 54B of the plate 31B and the gasket 4B are in flat surface contact with each other. Accordingly, hermetic sealing between the plate 31B and the gasket 4B is improved at each flat contact surface 54B.

As a result, a space inside the gasket 4B is hermetically sealed between a top cover 3B and a wall portion 22B of a base plate 2B even if the fixing region 5B and the gasket 4B have a local gap therebetween.

Figure 15:
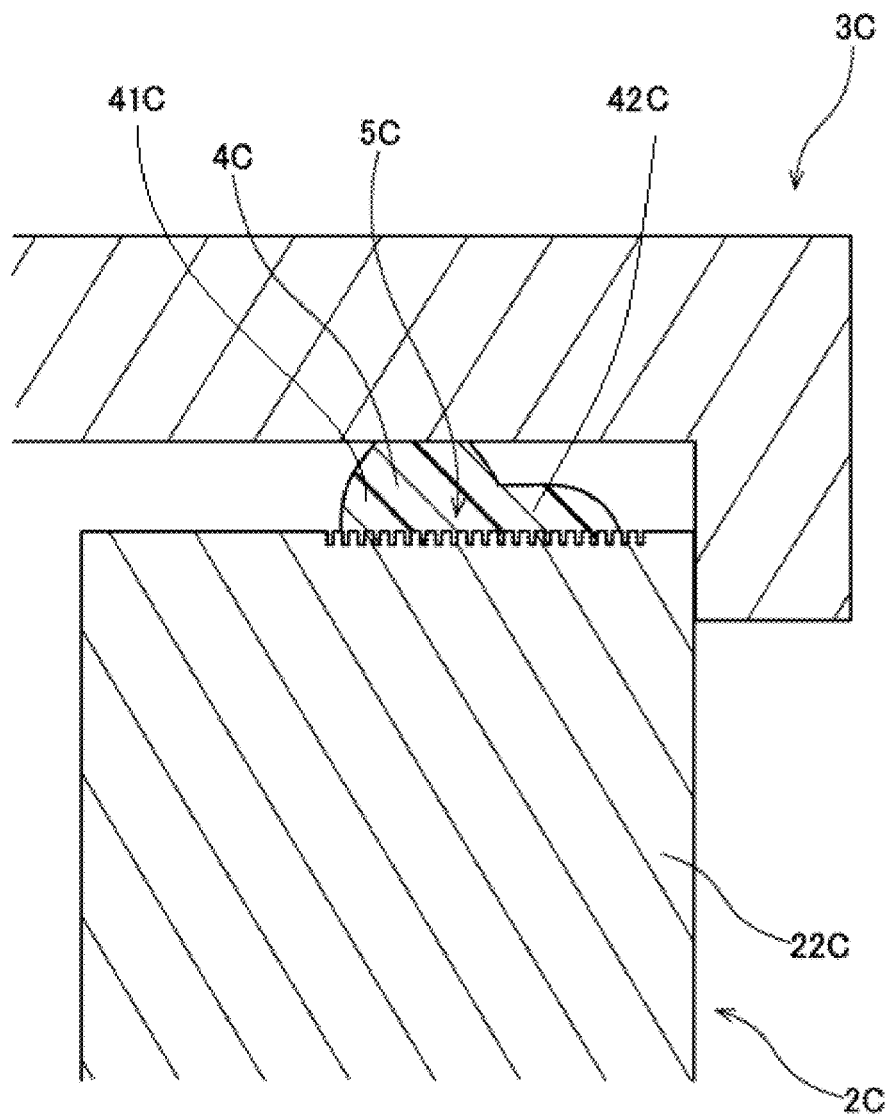
FIG. 15 is a partial vertical cross-sectional view of a disk drive apparatus according to a modification of the second preferred embodiment of the present invention.

FIG. 15 is a partial cross-sectional view of a preferred embodiment of a disk drive apparatus according to another modification of the second preferred embodiment. Illustration of the overall structure of the disk drive apparatus according to the modification illustrated in FIG. 15 is omitted. Similarly to the disk drive apparatus according to the second preferred embodiment illustrated in FIG. 3, the disk drive apparatus according to the modification illustrated in FIG. 15 preferably includes a base plate 2C including an upper opening, a top cover 3C made of a metal and arranged to cover the upper opening of the base plate 2C, a gasket 4C made of an elastomer, a spindle motor, and an access portion (not shown). The access portion is arranged to perform at least one of reading and writing of information from or to a disk supported by the spindle motor.

The base plate 2C preferably includes a wall portion 22C and a bottom portion (not shown) arranged to extend below the top cover 3C substantially in parallel with the top cover 3C. The wall portion 22C extends upward from an outer circumferential portion of the bottom portion, and surrounds the bottom portion. The top cover 3C is arranged to close an upper side of the base plate 2C. A rotating portion of the spindle motor and the access portion are accommodated in an interior of a case defined by the base plate 2C and the top cover 3C.

In the modification illustrated in FIG. 15, the gasket 4C is fixed to an upper end surface of the wall portion 22C. The base plate 2C includes a fixing region 5C in the upper end surface of the wall portion 22C. The gasket 4C is closely adhered to the fixing region 5C. The gasket 4C is arranged to be in contact with a lower surface of the top cover 3C around the upper opening of the base plate 2C. A space inside the gasket 4C is thereby hermetically sealed between the top cover 3C and the wall portion 22C of the base plate 2C.

In plan view, the fixing region 5C preferably includes a plurality of ridges (not shown) and a plurality of filamentous projections (not shown) arranged to extend from each ridge. The ridges and the filamentous projections included in the fixing region 5C increase an area of contact between the base plate 2C and the gasket 4C. The gasket 4C and the fixing region 5C of the base plate 2C are thus mechanically joined to each other through an anchor effect. As a result, the gasket 4C is securely fixed to the base plate 2C.

As described above, the gasket 4C may be closely adhered to the fixing region 5C defined not in the top cover 3C but in the base plate 2C. Even in this case, the gasket 4C is fixed to the base plate 2C without use of an adhesive.

Preferred embodiments of the present invention are applicable to a variety of disk drive apparatuses. A disk drive apparatus to which preferred embodiments of the present invention are applied may be configured to rotate another type of disk than the magnetic disk, e.g., an optical disk. Note, however, that preferred embodiments of the present invention are especially suitable for a disk drive apparatus configured to rotate a magnetic disk, because a particularly high degree of cleanliness is required in an interior of a case of the disk drive apparatus arranged to rotate the magnetic disk.

Also note that a spindle motor used in a disk drive apparatus according to a preferred embodiment of the present invention may be either a spindle motor of a so-called outer-rotor type in which a magnet is arranged radially outside a stator, or a spindle motor of an inner-rotor type in which a magnet is arranged radially inside a stator.

Also note that a spindle motor used in a disk drive apparatus according to a preferred embodiment of the present invention may be either a spindle motor of a so-called rotating-shaft type in which a shaft belongs to a rotating portion, or a spindle motor of a so-called fixed-shaft type in which a shaft belongs to a stationary portion.

Also note that the structure of a bearing mechanism used in a spindle motor according to a preferred embodiment of the present invention is not limited to the structure illustrated in FIG. 3.

Also note that the detailed shape of any member may be different from the shape thereof as illustrated in the accompanying drawings of the present application. Also note that features of the above-described preferred embodiments and the modifications thereof may be combined appropriately as long as no conflict arises.

For example, the fixing region 5C of the base plate 2C illustrated in FIG. 15 preferably includes the plurality of ridges and the plurality of filamentous projections, and at least one of the plurality of ridges may be annular or substantially annular in shape. Also, at least some of the ridges may preferably be arranged to overlap with one another.

Also, the fixing region 5C may include a first row of ridges arranged to overlap with one another. Also, the first row may be arranged to extend in a first direction.

Also, the fixing region 5C may further include a second row of ridges arranged to overlap with one another. The second row may be arranged to extend in a second direction different from the first direction. Further, the first row and the second row may be arranged to cross each other.

Also, the fixing region 5C may have a width greater than that of the gasket 4C.

Also, the fixing region 5C may have a width smaller than that of the gasket 4C.

Also, as illustrated in FIG. 15, the gasket 4C may preferably include a body portion 41C with a uniform or substantially uniform width, and a projecting portion 42C arranged to project from a side surface of the body portion 41C toward an outer circumference of the wall portion 22C along an upper surface of the wall portion 22C, and each of the body portion 41C and the projecting portion 42C may be arranged to be in contact with the fixing region 5C.

Also, the gasket 4C may preferably include a gate mark (not shown), and the gate mark may be located in the projecting portion 42C.

Also, the fixing region 5C may preferably include a first rugged portion and a second rugged portion. Also, when a distribution density of the ridges in the first rugged portion and a distribution density of the ridges in the second rugged portion are defined as a first density and a second density, respectively, the second density may be greater than the first density.

Preferred embodiments of the present invention and modifications thereof are applicable to a top cover, a disk drive apparatus, and a method of manufacturing the top cover.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A top cover for use in a disk drive apparatus, the top cover comprising:
    a plate made of a metal; and
    a gasket made of an elastomer, and fixed to the plate; wherein
    a surface of the plate includes a fixing region to which the gasket is fixed; and
    in plan view, the fixing region includes a plurality of ridges and a plurality of filamentous projections extending from each of the plurality of ridges.

2. The top cover according to claim 1, wherein at least one of the plurality of ridges is annular or substantially annular in shape.

3. The top cover according to claim 1, wherein at least some of the plurality of ridges overlap with one another.

4. The top cover according to claim 1, wherein
    the plurality of ridges included in the fixing region include a first row of ridges overlap with one another; and
    the first row extends in a first direction.

5. The top cover according to claim 4, wherein
the plurality of ridges included in the fixing region further include a second row of ridges overlap with one another;
the second row extends in a second direction different from the first direction; and
the first row and the second row cross each other.

6. The top cover according to claim 4, wherein the fixing region has a width greater than that of the gasket.

7. The top cover according to claim 4, wherein the fixing region has a width smaller than that of the gasket.

8. The top cover according to claim 1, wherein
the top cover is square, substantially square, rectangular or substantially rectangular;
the gasket extends along an outer edge of the top cover;
the gasket includes:
 a body portion with a uniform or substantially uniform width; and
 a projecting portion projecting from a side surface of the body portion toward an outer circumference of the plate along the surface of the plate; and
each of the body portion and the projecting portion is in contact with the fixing region.

9. The top cover according to claim 8, wherein
the gasket includes a gate mark; and
the gate mark is located in the projecting portion.

10. The top cover according to claim 1, wherein the fixing region includes:
a first rugged portion in which a distribution density of the ridges is a first density; and
a second rugged portion in which the distribution density of the ridges is a second density greater than the first density.

11. A disk drive apparatus comprising:
a base plate including a bottom portion and a wall portion extends upward from an outer circumferential portion of the bottom portion, and surrounds the bottom portion;
the top cover of claim 1 arranged to close an upper side of the base plate to define a case together with the base plate;
a spindle motor; and
an access portion configured to perform at least one of reading and writing of information from or to a disk supported by the spindle motor; wherein
the gasket is in contact with an upper end portion of the wall portion; and
a rotating portion of the spindle motor and the access portion are accommodated in an interior of the case defined by the base plate and the top cover.

12. A disk drive apparatus comprising:
a base plate including a bottom portion and a wall portion extending upward from an outer circumferential portion of the bottom portion, and surrounding the bottom portion;
a top cover made of a metal, and arranged to close an upper side of the base plate to define a case together with the base plate;
a gasket made of an elastomer, fixed to an upper end surface of the wall portion, and in contact with a lower surface of the top cover;
a spindle motor; and
an access portion configured to perform at least one of reading and writing of information from or to a disk supported by the spindle motor; wherein
a rotating portion of the spindle motor and the access portion are accommodated in an interior of the case defined by the base plate and the top cover;
the base plate includes, in the upper end surface of the wall portion, a fixing region to which the gasket is fixed; and
in plan view, the fixing region includes a plurality of ridges and a plurality of filamentous projections extending from each of the plurality of ridges.

13. The base plate of the disk drive apparatus of claim 12, wherein at least one of the ridges is annular or substantially annular in shape.

14. The base plate of the disk drive apparatus of claim 12, wherein at least some of the plurality of ridges overlap with one another.

15. The base plate of the disk drive apparatus of claim 12, wherein
the plurality of ridges included in the fixing region include a first row of ridges overlap with one another; and
the first row extends in a first direction.

16. The base plate according to claim 15, wherein
the plurality of ridges included in the fixing region further include a second row of ridges overlap with one another;
the second row extends in a second direction different from the first direction; and
the first row and the second row cross each other.

17. The base plate according to claim 15, wherein the fixing region has a width greater than that of the gasket.

18. The base plate according to claim 15, wherein the fixing region has a width smaller than that of the gasket.

19. The disk drive apparatus according to claim 12, wherein
the gasket includes:
 a body portion with a uniform or substantially uniform width; and
 a projecting portion projecting from a side surface of the body portion toward an outer circumference of the wall portion along an upper surface of the wall portion; and
each of the body portion and the projecting portion is in contact with the fixing region.

20. The disk drive apparatus according to claim 19, wherein
the gasket includes a gate mark; and
the gate mark is located in the projecting portion.

21. The disk drive apparatus according to claim 12, wherein the fixing region includes:
a first rugged portion in which a distribution density of the plurality of ridges is a first density; and
a second rugged portion in which the distribution density of the plurality of ridges is a second density greater than the first density.

22. A method of manufacturing a top cover for use in a disk drive apparatus, the method comprising the steps of:
a) defining, in a surface of a plate, a fixing region including a plurality of ridges and, in plan view, a plurality of filamentous projections extending from each of the plurality of ridges;
b) cleaning the plate after step a); and
c) injection-molding a gasket on the plate after step b); wherein in step c), the gasket is fixed to the fixing region.

* * * * *